(12) United States Patent
Magin et al.

(10) Patent No.: US 12,544,838 B2
(45) Date of Patent: Feb. 10, 2026

(54) CUTTING ELEMENT AND THE USE THEREOF

(71) Applicant: CERATIZIT Luxembourg S.a.r.l., Mamer (LU)

(72) Inventors: Michael Magin, Mamer (LU); Louis Patrick Fetcheping Kemdem, Mamer (LU)

(73) Assignee: CERATIZIT Luxembourg S.a.r.l., Mamer (LU)

( * ) Notice: Subject to any disclaimer, the term of this patent is extended or adjusted under 35 U.S.C. 154(b) by 701 days.

(21) Appl. No.: 17/784,737

(22) PCT Filed: Dec. 1, 2020

(86) PCT No.: PCT/EP2020/084028
§ 371 (c)(1),
(2) Date: Jun. 13, 2022

(87) PCT Pub. No.: WO2021/115836
PCT Pub. Date: Jun. 17, 2021

(65) Prior Publication Data
US 2023/0001487 A1    Jan. 5, 2023

(30) Foreign Application Priority Data
Dec. 12, 2019 (EP) .................................... 19215487

(51) Int. Cl.
*B23B 27/14* (2006.01)
(52) U.S. Cl.
CPC ...... *B23B 27/145* (2013.01); *B23B 2200/245* (2013.01); *B23B 2222/16* (2013.01);
(Continued)

(58) Field of Classification Search
CPC .......... B23B 2200/245; B23B 2222/16; B23B 2222/28; B23B 2228/105; B23B 2228/08;
(Continued)

(56) References Cited

U.S. PATENT DOCUMENTS 5,585,176 A * 12/1996 Grab ....................... C23C 16/56
428/408
5,771,763 A    6/1998 Naeslund et al.
(Continued)

FOREIGN PATENT DOCUMENTS

CN    201712073 U    1/2011
CN    110497005 A    11/2019
(Continued)

OTHER PUBLICATIONS

English translation of JP 2019048361 (Year: 2019).*

*Primary Examiner* — Alan Snyder
(74) *Attorney, Agent, or Firm* — Laurence A. Greenberg; Werner H. Stemer; Ralph E. Locher

(57) ABSTRACT

A cutting element, which is configured for the machining of a non-metallic composite material composed of a matrix and particles held together by the matrix, has a flank face, a rake face and a cutting edge which is coated with an edge coating and via which the flank face and the rake face are connected to one another, with which the non-metallic composite material can be machined in an improved fashion. The cutting edge within a cutting edge section thereof is curved in such a way that the cutting edge immediately beneath the edge coating in a section in a section plane that is perpendicular to the cutting edge has, at every point of the cutting edge section, a local radius of curvature which is greater than or equal to 10 μm and less than or equal to 80 μm.

18 Claims, 3 Drawing Sheets

(52) U.S. Cl.
CPC ..... *B23B 2222/28* (2013.01); *B23B 2226/275* (2013.01); *B23B 2228/04* (2013.01); *B23B 2228/105* (2013.01); *B23C 2200/246* (2013.01)

(58) Field of Classification Search
CPC ............ B23B 2228/04; B23B 2228/10; B23B 27/145; B23C 2200/246
See application file for complete search history.

(56) References Cited

U.S. PATENT DOCUMENTS

| | | | |
|---|---|---|---|
| 5,967,015 | A | 10/1999 | Grebe |
| 6,287,682 | B1 | 9/2001 | Grab et al. |
| 7,861,807 | B2 | 1/2011 | Probst et al. |
| 10,562,104 | B2 | 2/2020 | Sagara |
| 10,745,802 | B2 | 8/2020 | Shikada et al. |
| 2009/0245948 | A1 | 10/2009 | Motomura |
| 2010/0167044 | A1 | 7/2010 | Pretorius et al. |
| 2012/0051854 | A1 | 3/2012 | Pretorius |
| 2013/0209183 | A1 | 8/2013 | Chuo et al. |
| 2014/0124098 | A1 | 5/2014 | Duttlinger et al. |
| 2015/0030401 | A1* | 1/2015 | Senbokuya ......... C23C 14/0641 407/119 |
| 2019/0344359 | A1 | 11/2019 | Ueda et al. |
| 2021/0114116 | A1* | 4/2021 | Blomqvist ................ B24C 1/02 |

FOREIGN PATENT DOCUMENTS

| | | | |
|---|---|---|---|
| DE | 69422269 T2 | 5/2000 | |
| EP | 1188504 A1 | 3/2002 | |
| EP | 1350587 A1 | 10/2003 | |
| EP | 3015236 A1 | 5/2016 | |
| EP | 3492204 A1 | 6/2019 | |
| JP | H0797603 A | 4/1995 | |
| JP | 2009269097 A | 11/2009 | |
| JP | 2010520069 A | 6/2010 | |
| JP | 2010221353 A | 10/2010 | |
| JP | 2014193513 A | 10/2014 | |
| JP | 2019042917 A | 3/2019 | |
| JP | 2019048361 A | 3/2019 | |
| WO | 2012162849 A1 | 12/2012 | |
| WO | 2018092364 A1 | 5/2018 | |
| WO | 2018174139 A1 | 9/2018 | |

* cited by examiner

CUTTING ELEMENT AND THE USE THEREOF

FIELD AND BACKGROUND OF THE INVENTION

The present invention relates to a cutting element, which is configured for the machining of a non-metallic composite material composed of a matrix and particles held together by the matrix, having a flank face, a rake face and a cutting edge which is coated with an edge coating and via which the flank face and the rake face are connected to one another.

In addition, the present invention relates to the use of the cutting element.

In the non-metallic composite material, the particles are for example formed by wood, for example in the form of wood chips or wood fibers, or by carbon, for example in the form of carbon fibers, or glass, for example in the form of glass fibers, or by a mineral of natural or synthetic origin, for example in the form of mineral fibers. The matrix is based, for example, on one or more organic compounds, especially in the form of a plastic.

In the case of wood chips and wood fibers, the matrix is formed by a specific plastic, namely an adhesive, for example a glue, the wood chips and/or wood fibers are soaked therein and subsequently pressed. If wood chips are used, this results, for example, in particle boards, and if in contrast wood fibers are used, this results, for example, in what are known as medium density fiberboards (MDF) or high density fiberboards (HDF). MDF boards and HDF boards are moreover usually provided with a plastic coating, a varnish or a veneer, since this can be visually appealing, but this makes machining even more challenging.

In the case of carbon fibers and glass fibers, which can be divided into short or long fibers depending on their length (the same also applies to wood fibers), the matrix is formed by a plastic. Depending on these particles, the thus-formed non-metallic composite material is referred to as carbon-fiber-reinforced plastic (CFRP) or glass-fiber-reinforced plastic (GFRP).

When machining non-metallic composite material, which differs fundamentally from the machining of metals and alloys thereof, typically abrasive wear occurs mainly at a cutting edge, but also at the adjoining regions of the flank face and the rake face. If the wear has proceeded too far, the quality of the machined non-metallic composite material is no longer acceptable.

The generic cutting element previously known from WO 2012/162849 A1 is therefore coated. The service life is accordingly increased compared to an uncoated cutting element.

However, in the case of the previously known cutting element, the coating has a tendency to flake off under high cutting edge loading. This reduces the service life that can actually be achieved by the edge coating.

SUMMARY OF THE INVENTION

The object of the present invention is therefore that of specifying a cutting element and a use with a relatively long service life, by which the non-metallic composite material, especially in the form of a particle board, MDF, HDF, GFRP or CFRP, can be machined in improved fashion.

This object is achieved by a cutting element as claimed in the independent cutting element claim. Advantageous developments are given in the claims dependent thereon.

The cutting element, which is configured for the machining of a non-metallic composite material composed of a matrix and particles held together by the matrix, has a flank face, a rake face and a cutting edge which is coated with an edge coating and via which the flank face and the rake face are connected to one another, wherein the cutting edge within a cutting edge section thereof is curved in such a way that the cutting edge immediately beneath the edge coating in a section in a section plane that is perpendicular to the cutting edge has, at every point of the cutting edge section, a local radius of curvature which is greater than or equal to 10 pm and less than or equal to 80 µm, preferably greater than or equal to 15 µm and less than or equal to 60 µm, more preferably still greater than or equal to 20 µm and less than or equal to 40 µm. This provides a rounded cutting edge which gives the cutting element a sufficiently sharp cut (the edge coating which engages with the non-metallic composite material during machining can configured following the edge coating, for example because it has been deposited thereon), and at the same time has sufficiently low curvature, due to the radius of curvature at every point of the cutting edge section in the section in the section plane, to ensure the adhesion of the edge coating in improved fashion. The cutting edge can accordingly be of circular or elliptical or otherwise rounded form within the cutting edge section in the section in the section plane.

The cutting edge section can be symmetric or asymmetric in the section in the section plane.

The flank face and/or the rake face may each comprise one or more chamfers before they are joined together by the cutting edge. The flank face and/or the rake face may be of flat, faceted or curved configuration or a combination thereof.

The cutting edge may be straight or curved between two outer corners of the cutting element, or extend in according to a combination thereof; a normal vector of the perpendicular section plane is in this case parallel to a tangent applied to the cutting edge at one point.

According to a development of the cutting element, the cutting edge section extends over at least 50%, preferably at least 70%, more preferably still at least 90%, of the cutting edge in the section in the section plane. This improves the adhesion of the edge coating within this section, since the latter has low curvature corresponding to the radius of curvature. In the case of a radius of curvature that is constant at all points, it is particularly advantageous if the cutting edge section extends over 100%, i.e. the entire cutting edge, in the section in the section plane.

The edge coating preferably follows the shape of the cutting edge, i.e. is curved in such a way that, in the section in the section plane that is perpendicular to the cutting edge, it has at every point a local different radius of curvature that is greater than the radius of curvature at the opposite point of the cutting edge immediately beneath the edge coating.

The composition of the edge coating, which may comprise a plurality of individual layers or just one layer, differs from the composition of the cutting edge, that is to say the corresponding composition of a substrate body which forms the cutting edge, the rake face and the rake face. As a result, the edge coating forms an outer cutting edge, opposite the cutting edge section, of the cutting element, which outer cutting edge has a sufficiently sharp cut and at the same time sufficient adhesion to the substrate body on account of the curved cutting edge.

According to a development of the cutting element, the radius of curvature is of equal size at at least two different points, preferably at all points, of the cutting edge section in the section in the section plane. If it is of equal size at all points, the cutting edge is circular in the section in the section plane, which is particularly good in terms of adhesion of the edge coating.

According to a development of the cutting element, the flank face and the rake face define a wedge angle in the section in the section plane, a smallest radius of curvature of the radii of curvature defines the position and the radius of a circle in the section in the section plane, and the center of this circle defines a point on an angle bisector defined by the wedge angle. As a result, the cutting edge achieves its maximum cutting sharpness at an outer point thereof, with sufficient adhesion of the edge coating being provided there at the same time. This is a shape which is particularly well suited, when the edge coating follows it, for the machining of the non-metallic composite material. The vertex of the wedge angle here lies outside of the cutting edge section (it can possibly lie within the edge coating), one of its angle legs is tangent to the rake face and the other of its angle legs is tangent to the flank face. The vertex is a point on the angle bisector through which the inner wedge angle, i.e. the one facing the cutting edge, is bisected. Because of this, the cutting edge obtains a particularly sharp cut while maintaining sufficient adhesion of the edge coating.

According to a development of the cutting element, the cutting edge is formed by a cemented carbide or cermet at least in the region of the cutting edge section. Because the cutting edge and hence a corresponding substrate body of the cutting element that also forms the cutting edge are formed by one of these materials in the region of the cutting edge, the service life of the cutting element is yet further increased, since these are particularly hard and wear-resistant.

In the context of the present disclosure, cemented carbide (cemented carbide) and cermet are both composite materials in which hard material particles, which make up the predominant constituent of the composite material, form a skeleton or framework structure the interstices of which are filled by a metallic binder which is more ductile in comparison. The hard material particles may especially be at least predominantly formed by tungsten carbide, titanium carbide and/or titanium carbonitride, where smaller amounts of, for example, other hard material particles, in particular carbides of elements of groups IV to VI of the periodic table, may also be present. The ductile metallic binder typically consists at least predominantly of cobalt, nickel, iron or a base alloy of at least one of these elements. However, smaller amounts of yet further elements may also be dissolved in the metallic binder. A base alloy is to be understood as meaning that this element forms the predominant constituent of the alloy. The most frequent uses of cemented carbide are those in which the hard material particles are at least predominantly formed by tungsten carbide and the metallic binder is a cobalt or cobalt-nickel base alloy; the proportion by weight of the corresponding tungsten carbide particles is in this case in particular at least 70 percent by weight, preferably more than 80 percent by weight, more preferably more than 90 percent by weight, wherein this weight proportion can lie preferably in the range from including 70 percent by weight to including 99 percent by weight, more preferably from including 80 percent by weight to including 99 percent by weight, most preferably from including 90 percent by weight to including 99 percent by weight or from 94 percent by weight to 98 percent by weight.

In the context of the present disclosure skeleton structure is to be understood as meaning that the hard material particles, for example hard material particles formed substantially by tungsten carbide, form a cohesive particle network where any hard material particle is in contact with at least one other hard material particle.

According to a development of the cutting element, the cutting edge is formed by a cemented carbide at least in the region of the cutting edge section, wherein the cemented carbide has hard material particles, wherein the hard material particles form a skeletal structure of the cemented carbide and wherein the hard material particles have a grain size in the range from 0.1 µm to 1.5 µm, preferably from 0.15 µm to 0.8 µm, even more preferably from 0.2 µm to 0.5 µm. The grain size in one of these ranges (from 0.1 µm to 1.5 µm, preferably from 0.15 µm to 0.8 µm, even more preferably from 0.2 µm to 0.5 µm) gives the cutting edge a particularly stable adhesion to the edge coating, so that the lifetime of the edge coating is extended. The hard material particles in one of these ranges (from 0.1 µm to 1.5 µm, preferably from 0.15 µm to 0.8 µm, even more preferably from 0.2 µm to 0.5 µm) are preferably essentially formed by tungsten carbide.

In the context of the present disclosure substantially formed by tungsten carbide is to be understood as meaning that at least 90 percent of the hard material particles are formed by tungsten carbide, preferably 95 percent, most preferably 99 percent. The same applies in cases where the hard material particles are substantially formed by another hard material phase.

In the present disclosure grain size is measured as "linear intercept length" according to international standard ISO 4499-2:2008(E). EBSD micrographs (EBSD, electron backscatter diffraction) were used as a basis. The measurement methodology for such micrographs is described, for example, in: K. P. Mingard et al., Comparison of EBSD and conventional methods of grain size measurement of hard metals", Int. Journal of Refractory Metals & Hard Materials 27 (2009) 213-223.

The weight fraction of the hard material particles having the grain size in the range of from 0.1 µm to 1.5 µm, preferably from 0.2 µm to 0.8 µm, may in particular be in the range of from including 70 percent by weight to including 99 percent by weight, more preferably from including 80 percent by weight to including 99 percent by weight, most preferably from including 90 percent by weight to including 99 percent by weight or from 94 percent by weight to 99 percent by weight.

According to a development of the cutting element, the edge coating at least in the region of the cutting edge is formed by at least one deposited hard material layer, where the edge coating is formed on the cutting edge section. This increases the service life of the cutting element yet further, since such a hard material layer is particularly wear-resistant and is configured to follow the cutting edge, that is to say is correspondingly curved.

This development is further improved if the hard material layer is formed by diamond, amorphous carbon, cubic boron nitride or $TiB_2$. This yet further improves the service life. A plurality of polycrystalline hard material layers formed by diamond are particularly preferably deposited on the cutting edge section and hence the corresponding substrate body, in particular when this is formed by the cemented carbide or cermet. One or more hard material layers formed by amorphous carbon are preferably deposited on the cutting edge section and hence the corresponding substrate body, in particular when this is formed by the cemented carbide or cermet. Amorphous carbon is also known under the names DLC or diamond-like carbon. The layer or layers formed by amorphous carbon are preferably those containing hydrogen, the hydrogen content being at least 35 atomic percent (the remainder carbon), what is known as a:C, a-C:H amorphous carbon, or those in which the carbon is tetrahedral, where the hydrogen content is at least 25 atomic percent (the remainder carbon) and the carbon is spa hybridized, what is known as t-a:C, t-a-C:H amorphous carbon.

According to a development of the cutting element, the edge coating is configured so as to extend over the flank face and/or over the rake face. This increases the service life of the cutting element on one or both of these surfaces. Preferably, the microhardness of the edge coating, where this is formed on the flank face and/or on the rake face, corresponds to the microhardness of the edge coating where the edge coating is formed on the cutting edge section.

According to a development of the cutting element, a layer thickness of the edge coating at least in the region of the cutting edge is greater than or equal to 0.5 µm and less than or equal to 20 µm, preferably greater than or equal to 5 µm and less than or equal to 20 µm, where the edge coating is formed on the cutting edge section. These are layer thicknesses which increase the service life further not only in the case of the deposited diamond hard material layer or a plurality of layers thereof, but also of the deposited hard material layer of amorphous carbon or a plurality of layers thereof. In the context of the present disclosure, the layer thickness is defined as the smallest distance from the outer surface of the edge coating to the cutting edge section and hence the corresponding substrate body in the region thereof, i.e. perpendicular to a tangential plane applied to the edge coating.

According to a development of the cutting element, the edge coating is formed by a PVD or a CVD deposition process at least on the cutting edge section. The edge coating is accordingly deposited in a manner known to those skilled in the art by PVD (physical vapor deposition) or CVD (chemical vapor deposition); however, other methods for this are conceivable and also possible. After the deposition, the at least one hard material layer thus deposited is preferably subjected on its outer surface to a surface treatment by, for example, wet blasting or the like, in order to smooth it and eliminate any internal stresses present.

According to a development of the cutting element, it is in the form of a cutting blade. A blade edge is then formed by the cutting edge, this blade edge being particularly suitable for the machining of the composite material, especially when the particles are formed by wood chips or wood fibers; the cutting element is of flat configuration, in particular for the usually planar removal of thin layers from the composite material. This contrasts with a cutting element configured for the machining of metals and alloys thereof.

According to a development of the cutting element, it is provided on a drilling tool, milling tool, or planing tool. The increased service life of the cutting element due to its curved cutting edge is reflected advantageously in these tools. These tools in particular comprise the cutting element, meaning that a drilling tool, a milling tool or a planing tool is provided with the cutting element or a plurality thereof in the context of the present disclosure.

According to a development, the particles are formed by wood chips or wood fibers and the matrix is formed by an adhesive. The increased service life of the cutting element comes into play particularly well here, since the composite material thus formed is particularly abrasive. Alternatively, the particles may be formed by carbon fibers and the matrix According to a further development of the cutting element, it is configured for the machining of the non-metallic composite material, when the latter is a particle board, MDF, HDF, CFRP or GFRP.

The object is also achieved by the use as claimed in the independent use claim, i.e. by the use of a cutting element as claimed in the independent cutting element claim or a claim dependent thereon or the disclosed developments or embodiments of the cutting element for machining for machining the non-metallic composite material. The cutting element is then used in particular to separate the non-metallic composite material in a predefined manner, for example by milling or planing, the curved cutting edge ensuring a particularly clean cut even at high cutting speeds and relatively long cutting duration. The non-metallic composite material may be formed in regions in this case of a particle board, MDF or HDF, and in a remaining region be formed of GFRP or CFRP (this can be referred to as a hybrid non-metallic composite material), the cutting element being used to machine both regions in succession or together, for example along a common boundary surface.

The use of the cutting element is improved yet further when the particles are formed by wood chips or wood fibers and the matrix is formed by an adhesive. The advantage of the cutting element comes into play particularly well here, because it allows particularly clean cuts to be made in the particle board formed in this way in the case of wood chips and the MDF and HDF formed in this way in the case of wood fibers, while at the same time the service life is increased due to a better adhesion of the cutting edge coating.

The use of the cutting element is additionally improved when the particles are formed by carbon fibers or glass fibers and the matrix is formed by a plastic. A CFRP or a GFRP is thus provided. The advantage of the cutting element comes into play particularly well here, because it allows particularly clean cuts to be made in the CFRP and GFRP, while at the same time the service life is increased due to a better adhesion of the cutting edge coating.

The use of the cutting element is additionally improved yet further when a veneer, a plastics layer or a varnish is formed on a surface of the composite material, especially when the particles are formed by wood fibers or wood chips. The improved service life with sufficient cut sharpness then better comes into play, since these surface materials are severed particularly readily.

Further advantages and expedient features of the invention emerge from the following description of an exemplary embodiment with reference to the appended figures.

DETAILED DESCRIPTION OF THE INVENTION

Figure 1:
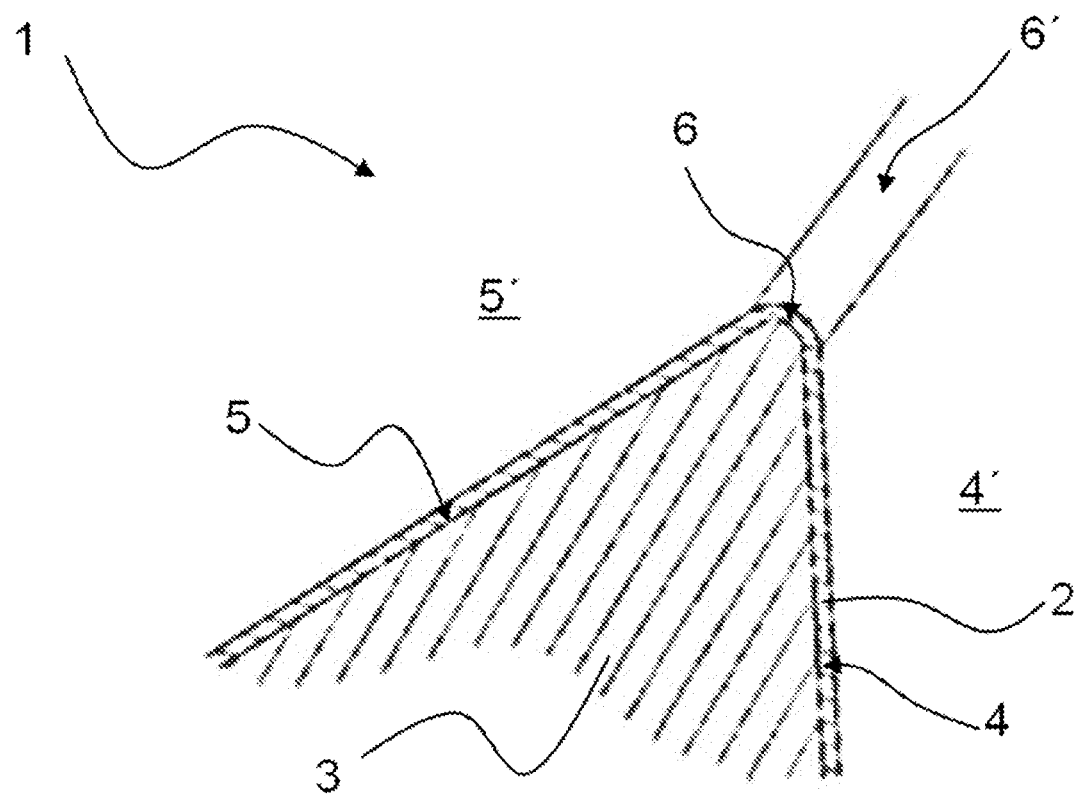
FIG. 1: shows a perspective, schematic and sectional view of a cross-sectional illustration of a coated cutting element in the region of its cutting edge, flank face and rake face.

FIG. 1 shows a perspective, schematic and sectional view of a cross-sectional illustration of a cutting element 1 for cutting a non-metallic composite material in the context of the present disclosure; a sectional illustration has thus been rotated in perspective so that the cross section and the remaining structure of the cutting element 1 are visible therefrom.

The cutting element 1 is coated with a hard material layer 2 of deposited polycrystalline diamond. The hard material layer 2 has in this case been deposited on a wedge-shaped substrate body 3, formed by a tungsten carbide-containing cemented carbide, of the cutting element 1, specifically on a flat flank face 4, a flat rake face 5 and a curved cutting edge 6 connecting the flank face 4 and the rake face 5; however, a plurality of hard material layers 2 of deposited diamond or another hard material such as for example amorphous carbon are also conceivable and possible.

The flank face 4, the rake face 5 and the cutting edge 6 are thus coated with the hard material layer 2; it therefore protects the comparatively relatively soft substrate body 3 from wear during machining. Actual engagement in the non-metallic composite material during machining is thus established by the hard material layer 2, which follows the shape of the substrate body 3 and accordingly is curved where the cutting edge 6 is formed and is flat where the flank face 4 and rake face 5 are formed. Although the substrate body 3 is fundamentally suitable for the machining of the non-metallic composite material, it is typically not sufficiently wear-resistant. Accordingly, the hard material layer 2 on the outside, i.e. facing the non-metallic composite material, has a cutting edge 6' which follows the cutting edge 6 and is accordingly curved, a flat flank face 4' following the flank face 4 and a flat rake face 5' following the rake face 5; the longitudinal extent of the cutting edge 6' is covered by the longitudinal extent of the cutting edge 6'. In other words, the contour of the substrate body 3 can be transformed into the outer contour of the hard material layer 2, and vice versa, by linear scaling.

The layer thickness of the hard material layer 3 is illustrated by way of example as constant, this being defined by the respectively smallest distance of its surfaces (flank face 4', rake face 5', the curved surface of the hard material layer 3 corresponding to the cutting edge 6') to the opposite faces of the substrate body (flank face 4, rake face 5, curved face of the substrate body 3 corresponding to the cutting edge 6).

At this point, it is explicitly noted that the hard material layer 3 may also be deposited only on the cutting edge 6 or only on the cutting edge 6 and the flank face 4 or only on the cutting edge 6 and the rake face 5.

Figure 2:
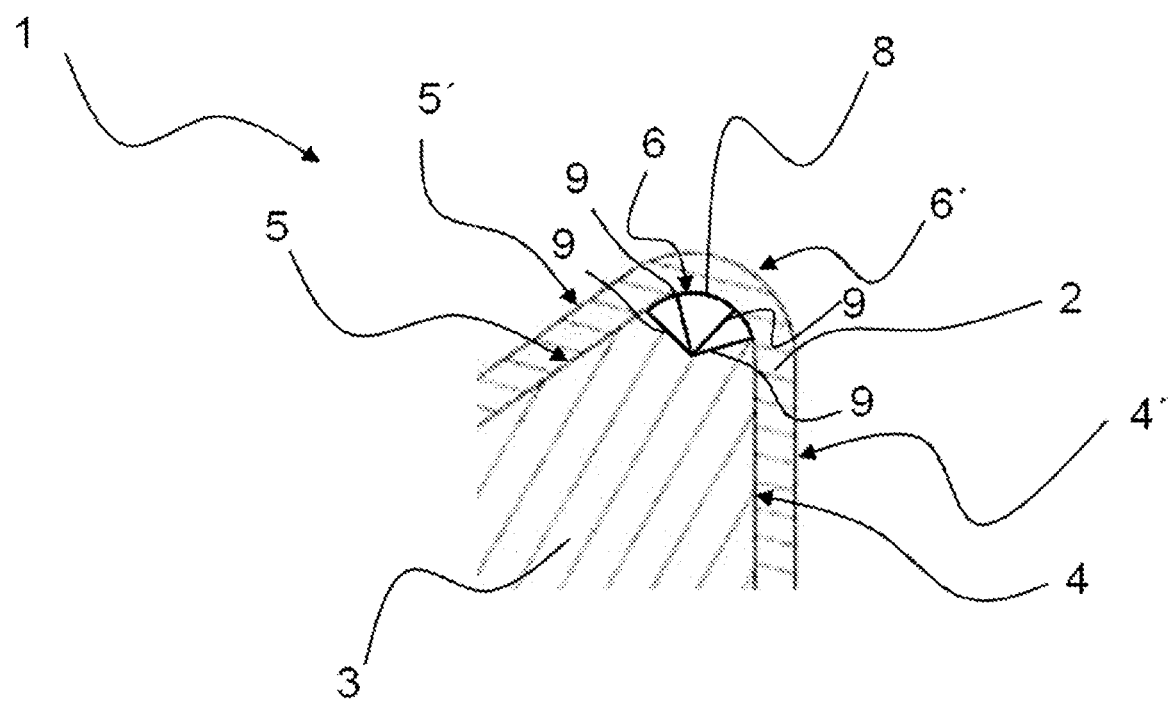
FIG. 2: shows a detailed illustration of the cutting element from FIG. 1 in section in a section plane perpendicular to the cutting edge.

In the detailed illustration, shown in FIG. 2, of the cutting element 1 in a section in a section plane perpendicular to the cutting edge 6 and hence the cutting edge 6', the curved cutting edge 6 is particularly readily visible. Within a circular cutting edge section 8 of the cutting edge 6, which extends over the entire cutting edge 9 immediately beneath the hard material layer 2, i.e. over 100% thereof, a correspondingly local radius of curvature 9 can be assigned to each point of the cutting edge section 8 (for reasons of clarity, only four radii of curvature 9 are shown). Since the cutting edge section 8 is circular, the radii of curvature 9 are of equal size. The cutting edge section 8 and hence the cutting edge 6 begin here on the flank face 4 side at the point at which the latter ceases to be flat, and on the rake face 5 side at the point at which the latter ceases to be flat. Accordingly, the cutting edge 6' begins here on the flank face 4' side at the point at which the latter ceases to be flat, and on the rake face 5' side at the point at which the latter ceases to be flat. The cutting edge 6' is therefore likewise curved in the form of a circle, but with a greater radius of curvature at each point thereof.

Figure 3:
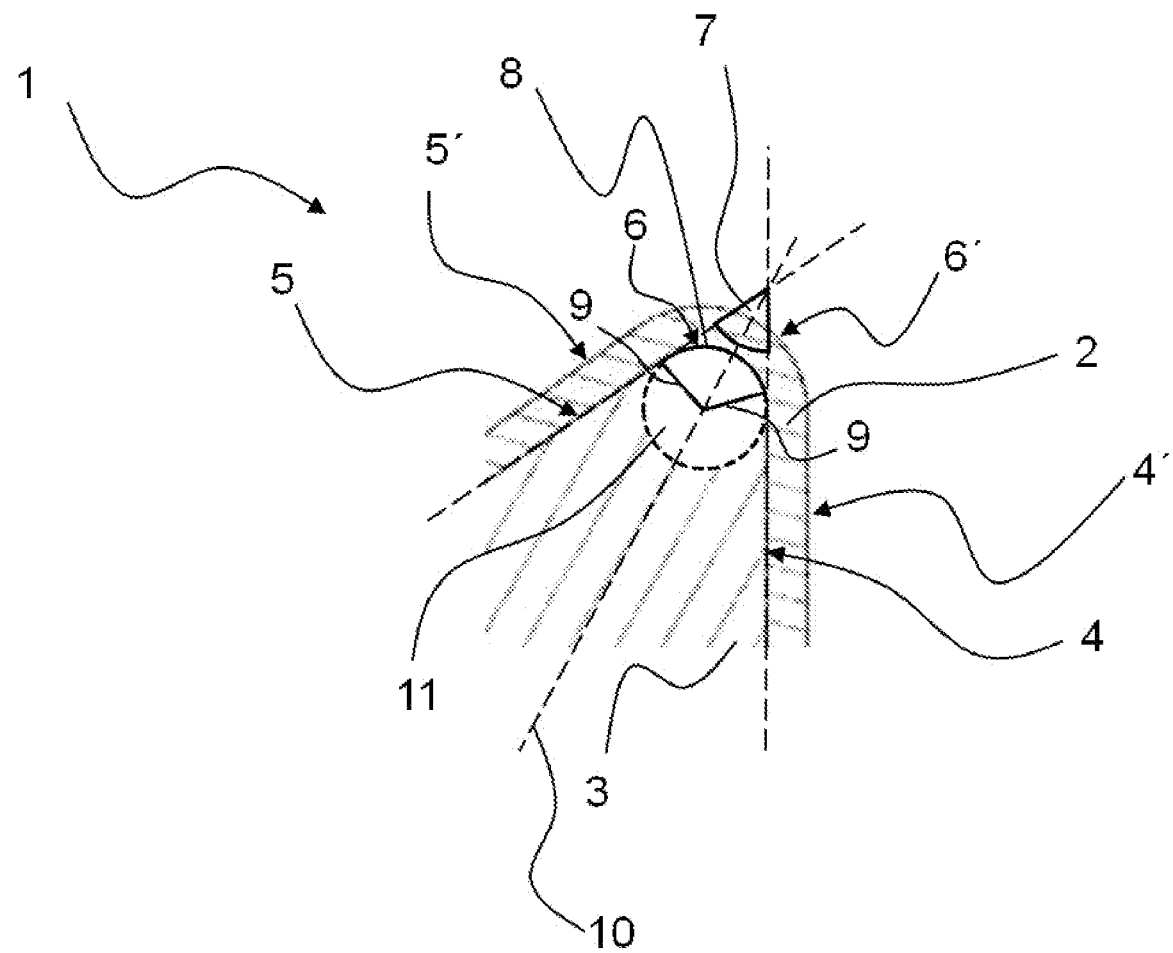
FIG. 3: shows a detailed illustration of the cutting element according to FIG. 2 with wedge angle additionally shown.

The illustration of FIG. 3 thus corresponds to that in FIG. 2, with the difference that it explicitly shows a wedge angle 7 that the flank face 4 and the rake face 5 form with one another; the wedge angle 7 is by way of example 56°, but smaller or larger wedge angles are conceivable and also possible. The bisector 10 of the wedge angle 7 here passes through the center of a circle 11, the center being defined by the radii of curvature 9.

The invention claimed is:

1. A cutting element being configured for machining a non-metallic composite material composed of a matrix and particles held together by the matrix, the cutting element comprising:
   a flank face;
   a rake face; and
   a cutting edge being coated by an edge coating and via said cutting edge, said flank face and said rake face are connected to one another, said cutting edge within a cutting edge section thereof is curved such that said cutting edge immediately beneath said edge coating in a section in a section plane that is perpendicular to said cutting edge has, at every point of said cutting edge section, a local radius of curvature which is greater than or equal to 10 µm and less than or equal to 80 µm;
   said cutting edge formed from a cemented carbide at least in a region of said cutting edge section;
   said cemented carbide having hard material particles forming a skeletal structure of said cemented carbide; and
   said hard material particles having a grain size in a range from 0.1 µm to 1.5 µm.

2. The cutting element according to claim 1, wherein said cutting edge section extends over at least 50% of said cutting edge in the section plane.

3. The cutting element according to claim 2, wherein said cutting edge section extends over at least 70% of said cutting edge in the section plane.

4. The cutting element according to claim 1, wherein said flank face and said rake face define a wedge angle in the section in the section plane, a smallest radius of curvature of a radii of curvature defines a position and a radius of a circle in the section in the section plane, and a center of the circle defines a point on an angle bisector defined by the wedge angle.

5. The cutting element according to claim 1, wherein said edge coating is formed from at least one deposited hard material layer, where said edge coating is formed on said cutting edge section.

6. The cutting element according to claim 5, wherein said deposited hard material layer is formed by diamond, amorphous carbon, cubic boron nitride or $TiB_2$.

7. The cutting element according to claim 1, wherein said edge coating is configured so as to extend over said flank face and/or over said rake face.

8. The cutting element according to claim 1, wherein:
   said edge coating has a layer thickness being greater than or equal to 0.5 µm and less than or equal to 20 µm;
   said edge coating is formed on said cutting edge section.

9. The cutting element according to claim 1, wherein said edge coating is formed by a physical vapor deposition process or a chemical vapor deposition process at least on said cutting edge section.

10. The cutting element according to claim 1, wherein the cutting element is provided on a drilling tool, milling tool, or a planing tool.

11. The cutting element according to claim 1, wherein the particles are particles of wood chips or wood fibers and the matrix is an adhesive.

12. The cutting element according to claim 1, wherein the local radius of curvature is greater than or equal to 15 µm and less than or equal to 60 µm.

13. The cutting element according to claim 1, wherein the local radius of curvature is greater than or equal to 20 µm and less than or equal to 45 µm.

14. The cutting element according to claim 1, wherein said grain size is in a range from 0.15 µm to 0.8 µm.

15. The cutting element according to claim 1, wherein said grain size is in a range from 0.2 µm to 0.5 µm.

16. A machining method, which comprises the steps of:
providing the cutting element according to claim 1; and
machining a non-metallic composite material with the cutting element.

17. The method according to claim 16, wherein the particles are formed by wood chips or wood fibers and the matrix is formed by an adhesive.

18. The method according to claim 16, wherein the particles are formed by carbon fibers or glass fibers and the matrix is formed by a plastic.

\* \* \* \* \*